(12) United States Patent
Yu

(10) Patent No.: US 7,242,911 B2
(45) Date of Patent: Jul. 10, 2007

(54) SYSTEM AND METHOD FOR ENHANCING TRANSMISSION AND RECEPTION OF A TRANSCEIVER

(75) Inventor: Jae-Wook Yu, Anyang (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 10/603,556

(22) Filed: Jun. 25, 2003

(65) Prior Publication Data
US 2004/0005867 A1    Jan. 8, 2004

(30) Foreign Application Priority Data
Jun. 29, 2002    (KR) ...................... 10-2002-0037621

(51) Int. Cl.
*H04B 1/44*    (2006.01)
(52) U.S. Cl. ...................... 455/78; 455/83; 455/275.1
(58) Field of Classification Search ............. 455/127.1, 455/522, 69, 39, 78, 560, 83, 88, 275.1
See application file for complete search history.

(56) References Cited

U.S. PATENT DOCUMENTS 5,896,563 A * 4/1999 Kawanami et al. ........... 455/82
6,195,535 B1 * 2/2001 Kurchuk ...................... 455/83
2002/0115436 A1 * 8/2002 Howell et al. .............. 455/426

FOREIGN PATENT DOCUMENTS

| CN | 2098090 U | | 3/1992 |
|----|-----------|---|--------|
| GB | 2277650 | * | 2/1994 |
| KR | 234201 B1 | | 9/1999 |
| WO | WO0054421 | | 9/2000 |
| WO | 1337759 | | 2/2002 |

* cited by examiner

*Primary Examiner*—Tilahun Gesesse
(74) *Attorney, Agent, or Firm*—Lee, Hong, Degerman, Kang & Schmadeka

(57) ABSTRACT

A transceiver of a terminal for use in a TDD-based mobile communication system is provided. The transceiver comprises a receiver for processing a reception signal in a reception mode; a transmitter for processing a transmission signal in a transmission mode; a switching mechanism operable in the transmission mode and the reception mode; and a ground divider for dividing grounds for the receiver, the transmitter, and the switching mechanism.

19 Claims, 4 Drawing Sheets

SYSTEM AND METHOD FOR ENHANCING TRANSMISSION AND RECEPTION OF A TRANSCEIVER

CROSS REFERENCE TO RELATED APPLICATION

Pursuant to 35 U.S.C. §119(a), this application claims the benefit of earlier filing date and right of priority to Korean Patent Application No. 2002-37621, filed on Jun. 29, 2002, the content of which is hereby incorporated by reference herein in its entirety.

BACKGROUND OF THE INVENTION

1. Field of the Invention

The present invention relates to a mobile communication system and, more particularly, to an isolation-enhanced system and method for a mobile station for a TDD-based mobile communication system.

2. Description of the Related Art

A time division synchronous CDMA (TD-SCDMA) is a third-generation mobile communication standard being developed by the initiative of China. The standard was approved by the ITU as a third generation mobile communication standard together with SCDMA and CDMA-2000 on November 1999.

The TD-SCDMA aims at increasing channel capacity and effectively managing resources by combining merits of time division duplex (TDD) and CDUA such as uplink synchronization and smart antenna.

In a TDD-based communication system such as the TD-SCDMA, transmission and reception channels are divided in time. Therefore, the receiving and transmitting modes of a mobile station are determined by the switching function of a transceiver. FIG. 1 is a block diagram illustrating an RF transceiver of a TD-SCDMA terminal. As shown, the transceiver switches between a reception or a transmission mode by operation of switch 3, controlled by a control signal.

In the reception mode, an RF signal received through antenna 1 is led to a receiving part of the transceiver such that the signal is amplified in a low-noise amplifier (LNA) 4, filtered by a filter 5, and then converted into a baseband signal in an intermediate frequency (IF) mixer. In the transmission mode, a transmission signal is up-converted in the IF mixer and is filtered by a transmission filter 8, amplified in an amplifier 7, and then transmitted over the air through isolator 6, switch 3, duplexer 2, and antenna 1.

Generally, in the mobile station for TD-SCDMA, a single pole double throw (SPDT) switch 3 is used for switching the transceiver between transmission and reception modes, and the isolator 6 is located right before the SPDT switch 3 on the transmission line to prevent a backflow of the transmission signal.

Unfortunately, in a conventional transceiver, there is a trade-off between isolation characteristics of the switch and an insertion loss for a receiving party, such that a switch with good isolation characteristics causes insertion loss for the receiving party and limits isolation performance of the commercial isolator.

In addition, if elements of a transmitting and receiving party are commonly grounded to a terminal frame with insufficient ground area, an undesired transmission signal can be induced to the receiving party through the ground line even though the undesired signal induction value depends on a PCB design. Since in power class A of the TD-SCDMA system, the maximum output power is +33 dBm and sensitivity level is −108 dBm. Therefore, the commercial SPDT switch is limited in fully isolating the transmission and reception channel.

SUMMARY OF THE INVENTION

In accordance with one embodiment of the invention, a transceiver of a terminal for use in a TDD-based mobile communication system comprises a receiver for processing a reception signal in a reception mode; a transmitter for processing a transmission signal in a transmission mode; a switching mechanism operable in the transmission mode and the reception mode; and a ground divider for dividing grounds for the receiver, the transmitter, and the switching mechanism.

The receiver comprises a low-noise amplifier for amplifying the reception signal provided by the switching mechanism in the reception mode; and a reception filter for filtering the amplified reception signal and for providing the filtered reception signal to an intermediate frequency processor. The transceiver of claim 1, wherein the transmitter comprises a transmission filter for filtering the transmission signal received from an intermediate frequency processor in the transmission mode; and an amplifier for amplifying the filtered transmission signal.

In some embodiments, the transmitter further comprises an isolator for isolating the transmitter from signal interference created by the switching mechanism. The switching mechanism comprises an antenna; a switch for selectively connecting the antenna to the receiver and the transmitter; and a duplexer positioned between the antenna and the switch.

The ground divider comprises a first ground separation element for isolating a receiver ground for the receiver and a common ground for the switching mechanism from each other; and a second ground separation element for isolating a transmitter ground for the transmitter and the common ground. Each of the first and second ground separation elements is an inductor, in one embodiment. In another embodiment, each of the first and second ground separation elements is a ferrite bead, for example.

In some embodiments, the switching mechanism comprises an antenna; a duplexer connected to the antenna, the duplexer selecting transmission and reception frequency via the antenna; a circulator for sending the reception signal from the duplexer to the receiver and for sending the transmission signal from the transmitter to the antenna, and a switch installed on a signal line between the circulator and the receiver, wherein the switch is turned on in the reception mode.

In accordance with yet another embodiment, a method of data communication in a TDD-based mobile communication system is provided. The method comprises processing a reception signal in a reception mode; processing a transmission signal in a transmission mode; where in a switching mechanism operable in the transmission mode and the reception mode; and dividing grounds for the receiver, the transmitter, and the switching mechanism.

The step of processing a reception signal in the reception mode comprises amplifying the reception signal provided by the switching mechanism, using a low-noise amplifier; filtering the amplified reception signal using a reception filter; and providing the filtered reception signal to an intermediate frequency processor.

The step of processing a transmission signal in a transmission mode comprises filtering the transmission signal received from an intermediate frequency processor using a transmission filter; and amplifying the filtered transmission signal. In one embodiment, the step of processing a transmission signal in a transmission mode further comprises isolating the transmitter from signal interference created by the switching mechanism. The dividing step comprises isolating a receiver ground for a receiver performing the receiving step from a common ground for the switching mechanism, using a first ground separation element.

In one or more embodiments, the dividing step comprises isolating a transmitter ground for a transmitter performing the transmitting step from a common ground for the switching mechanism, using a second ground separation element. The first or second ground separation elements may be inductors, for example. Alternatively the first or second ground separation elements may be ferrite beads.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

A transceiver of a mobile communication terminal in accordance with preferred embodiments of the present invention will now be described with reference to the accompanying drawings.

The transceiver, according to a first embodiment of the present invention comprises transmitting means, receiving means, and switching means. Said elements are grounded in isolation from each other to prevent interference.

Figure 1:
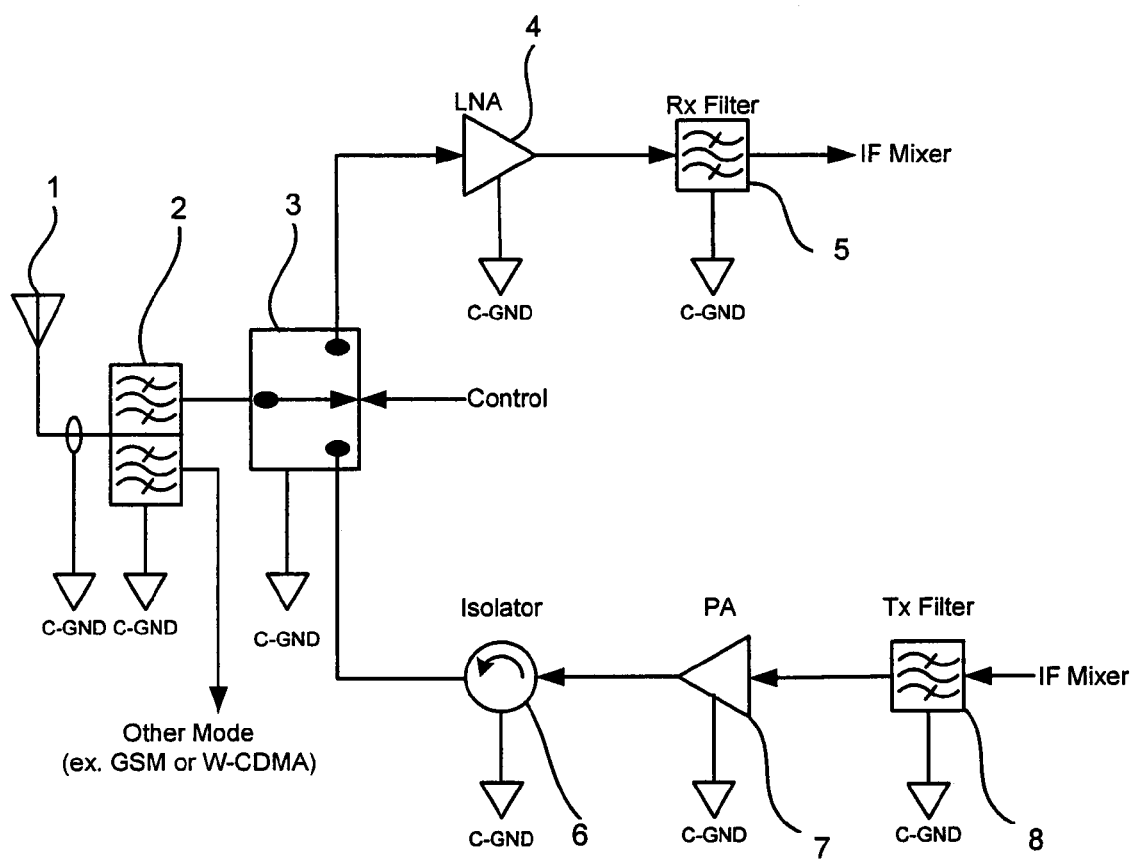
FIG. 1 is a block diagram of a conventional transceiver of a mobile communication terminal.
Figure 2:
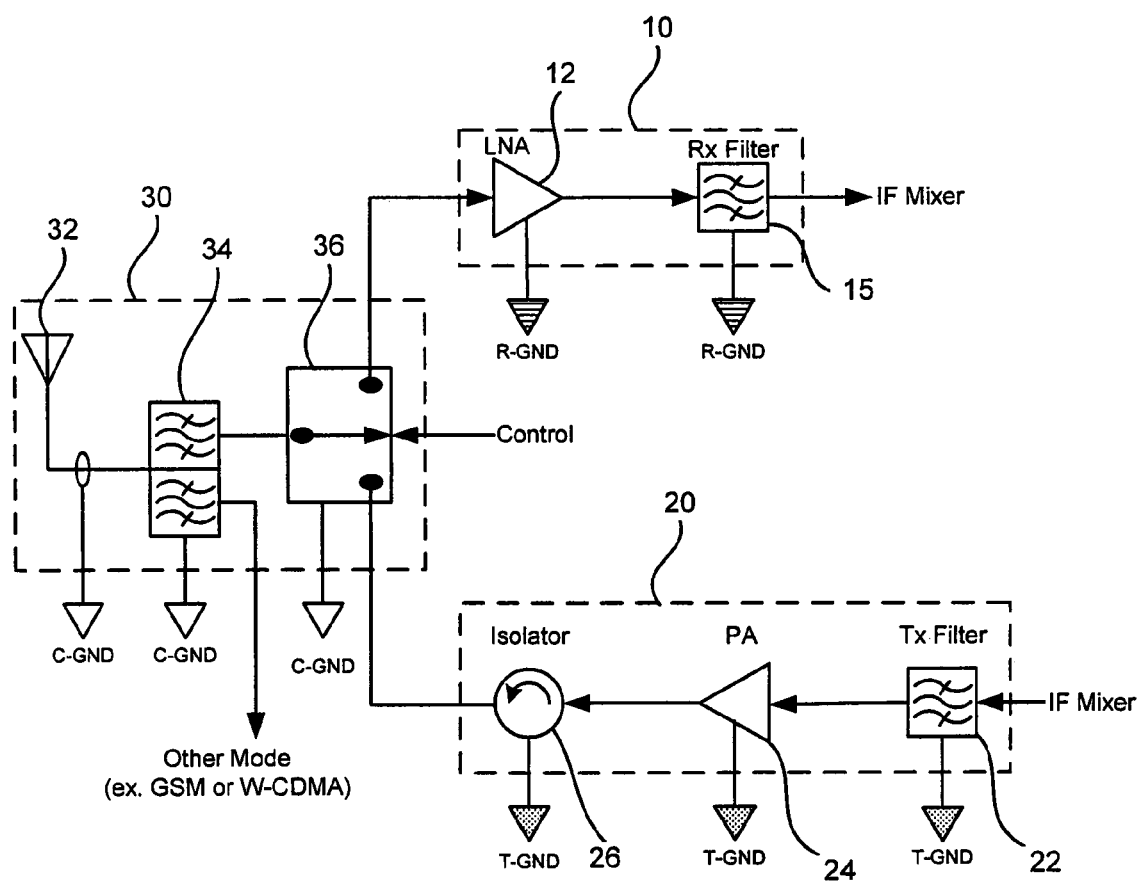
FIG. 2 is a block diagram of a transceiver of a mobile communication terminal, in accordance with an embodiment of the present invention.

Referring to FIG. 2, the transceiver of a mobile terminal, in accordance with one embodiment, comprises a receiver 10 for processing a reception signal in a reception mode, a transmitter 20 for processing a transmission signal in a transmission mode, and a switching mechanism 30, utilized in both the transmission and reception modes.

The receiver 10, for example, comprises a low-noise amplifier 12 for amplifying a received signal and a reception filter 15 for filtering the amplified received signal. The transmitter 20, for example, comprises a transmission filter 22 for filtering a transmission signal provided by an intermediate frequency (IF) processing module (not shown), an amplifier 24 for amplifying the filtered transmission signal, and an isolator 26 for preventing the transmission signal from being reflected.

The switching mechanism 30 comprises an antenna 32, a single pole double through (SPDT) switch 36 for providing transmission/reception switching modes by connecting the antenna 32 to the receiver 10 or the transmitter 20, according to a control signal. A duplexer 34 positioned preferably between the antenna 32 and the switch 36 is utilized for selecting transmission/reception frequencies, for example.

The low-noise amplifier 12 and the reception filter 15 are connected to a receiver ground (R-GND). The transmission filter 22, the amplifier 24, and the isolator 26 are connected to a transmitter ground (T-GND). The antenna 32, the duplexer 34 and the switch 36 are connected to a common ground (C-GND). In order to isolate the ground connections of the receiver 10, the transmitter 20, and the switching mechanism 30, the transceiver of the present invention has a ground divider.

Figure 3:
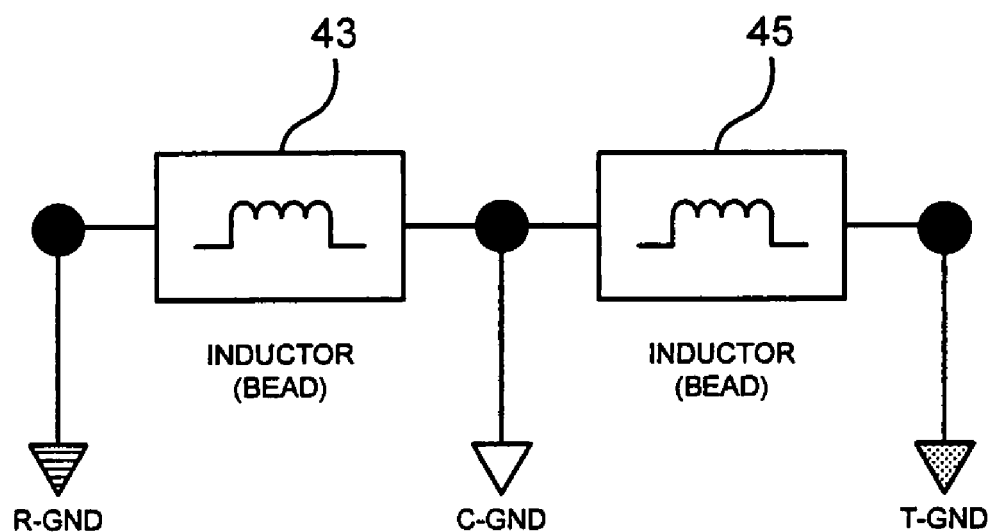
FIG. 3 is an exemplary circuit diagram of a ground divider of the transceiver of FIG. 2.

Referring to FIG. 3, the ground divider 40 comprises a first ground separation element 43 interposed preferably between the receiver ground (R-GND) and the common ground (C-GND), in accordance with one embodiment. A second ground separation element 45 is interposed preferably between the common ground (C-GND) and the transmitter ground (T-GND). Each of the first and second ground separation elements 43 and 45 is preferably an inductor having a radio frequency removal characteristics or a ferrite bead having fixed frequency removal characteristics, for example. It is noteworthy that in alternative embodiments, first and second ground separation elements 43 and 45 may be connected in between different components.

By isolating the ground connections of the receiver 10, the transmitter 20, and the switching mechanism 30 of the transceiver from each other, the possibility that a radio frequency signal produced at the transmitter 20 affects the receiver 10 can be minimized.

Figure 4:
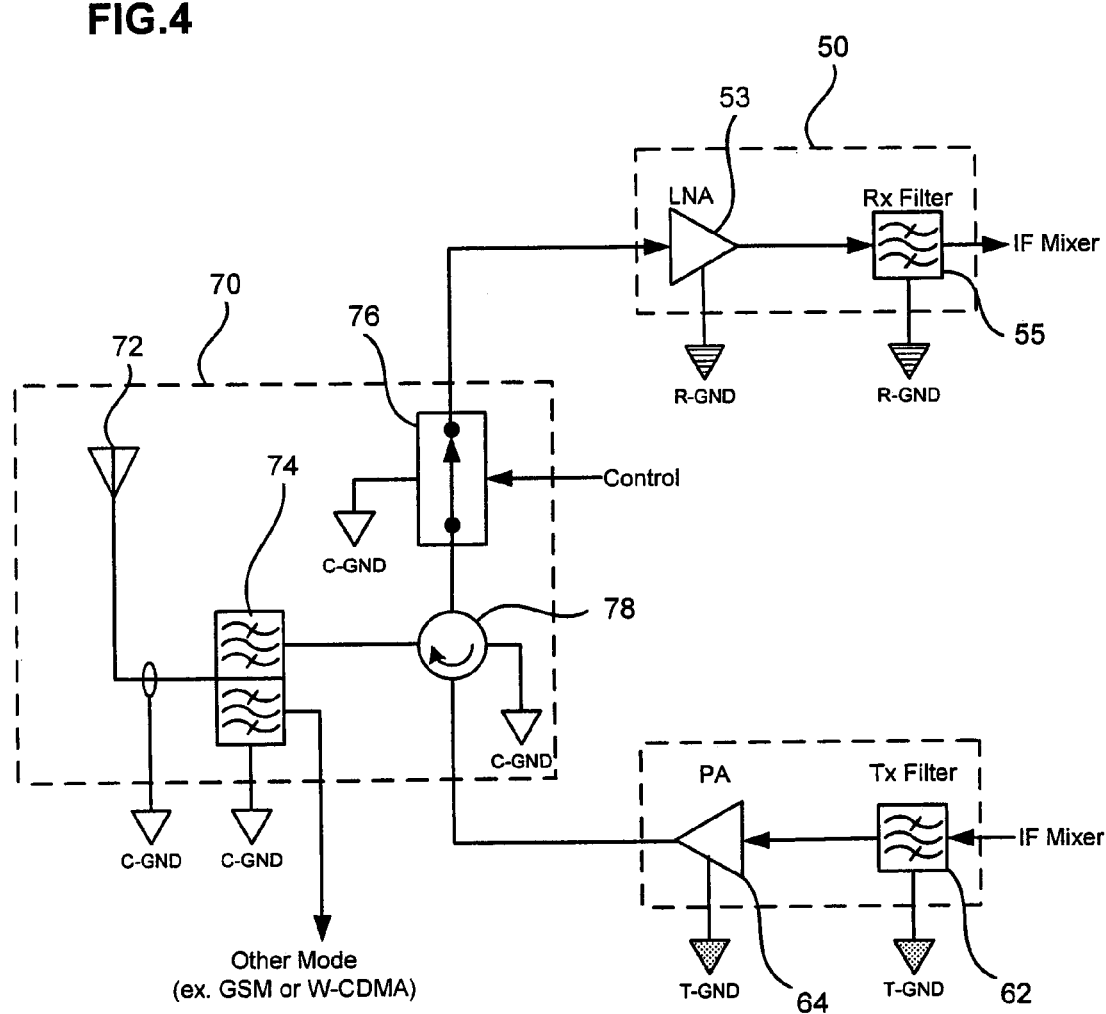
FIG. 4 is a block diagram of a transceiver of a mobile communication terminal, in accordance with another embodiment of the present invention.

Referring to FIG. 4, a transceiver in accordance with a second embodiment of the invention comprises a receiver 50 for processing a reception signal in a reception mode, a transmitter 60 for processing a transmission signal in a transmission mode, and a switching mechanism 70 operatable in both the transmission and reception modes.

The receiver 50 comprises a low-noise amplifier 53, for example, for amplifying a received signal and a reception filter 55 for filtering the amplified received signal. The transmitter 60 comprises a transmission filter 62 for filtering a transmission signal from an intermediate frequency processing module and an amplifier 64 for amplifying the filtered transmission signal. The switching mechanism 70 comprises a circulator 78 for leading a signal received through an antenna 72; a duplexer 74 for leading a transmission signal from the transmitter 60 to antenna 72; and a single pole single through (SPST) switch 76 arranged on a reception signal line between the receiver 50 and the circulator 78, for example.

The low-noise amplifier 53 and the reception filter 55 are connected to the receiver ground (R-GND). The transmission filter 62 and the amplifier 64 are connected to the transmitter ground (T-GND). And, the antenna 72, the duplexer 74, the circulator 78, and the SPST switch 76 are connected to the common ground (C-GND). A ground divider 40 (see FIG. 3) for isolating the ground connections of the receiver 50, the transmitter 60, and the switching mechanism 70 is provided to the transceiver, as discussed earlier.

In power class A of the TD-SCDMA, since a maximum transmission output power is +33 dBm and reference sensitivity is −108 dBm, a reliable transmission and reception isolation is unexpected with the isolation characteristics of the SPDT switch. In one embodiment, the transceiver is provided with the ground divider 40 for minimizing interference from the transmission signal to the receiver 10. The circulator 78 prevents the transmission signal produced at the transmitter from interfering with the receiver in the transmission mode. The SPST switch 76 is interposed preferably between the circulator 78 and the receiver 50, in one embodiment. The switch 76 turns on in the reception mode and turns off in the transmission mode, for example, so as to enhance isolation of the receiver 50 and the transmitter 60 from each other.

Accordingly, the isolation characteristic of the transceiver can be improved using the SPST switch 76 in addition to the isolation function of the circulator 78. The circulator 78 acts as a substitute for the existing SPDT switch of the conventional transceiver, in some embodiments. The SPST switch is located at the receiving party, therefore the switching timing is considered in the reception mode.

Thus, in one embodiment of the present invention, the ground connection of the transmitter and the receiver of the transceiver are isolated so as to prevent the transmission signal from interfering with the receiver. In another embodiment, the possibility of induction of the transmission radio frequency signal to the receiver is prevented by using the circulator and the SPST switch as well as the transmitter/receiver ground mechanism. As such, the overall transmission and reception isolation characteristics of the transceiver are enhanced.

The transceiver of the invention prevents a transmission signal from interfering with the receiver through ground lines by isolating the grounds of the transmitter and the receiver from each other. This enhances the isolation function using the isolator and the SPST switch. The overall transmission and reception isolation characteristics of the transceiver are strengthened, using the circuit implementation illustrated in FIGS. 2–4.

Further, the SPST switch is substituted for a conventional SPDT switch, in accordance with one embodiment. Thus, the switching timing is determined for the reception mode, resulting in simplification of switching timing design.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A transceiver of a terminal for use in a TDD-based mobile communication system comprising:
    a receiver for processing a reception signal in a reception mode;
    a transmitter for processing a transmission signal in a transmission mode;
    a switching mechanism operable in the transmission mode and the reception mode; and
    a ground divider for dividing grounds for the receiver, the transmitter, and the switching mechanism, such that electrical components of the receiver are coupled to a receiver ground exclusive to the receiver, electrical components of the transmitter are coupled to a transmitter ground exclusive to the transmitter, and electrical components of the switching mechanism are coupled to a common ground
    wherein the ground divider comprises:
    a first ground separation element for isolating the receiver ground from the common ground; and
    a second ground separation element for isolating the transmitter ground from the common ground.

2. The transceiver of claim 1, wherein the receiver comprises:
    a low-noise amplifier for amplifying the reception signal provided by the switching mechanism in the reception mode; and
    a reception filter for filtering the amplified reception signal and for providing the filtered reception signal to an intermediate frequency processor.

3. The transceiver of claim 2, wherein the switching mechanism comprises:
    an antenna;
    a duplexer connected to the antenna, the duplexer selecting transmission and reception frequency via the antenna;
    a circulator for sending the reception signal from the duplexer to the receiver and for sending the transmission signal from the transmitter to the antenna, and
    a switch installed on a signal line between the circulator and the receiver, wherein the switch is turned on in the reception mode.

4. The transceiver of claim 1, wherein the transmitter comprises:
    a transmission filter for filtering the transmission signal received from an intermediate frequency processor in the transmission mode; and
    an amplifier for amplifying the filtered transmission signal.

5. The transceiver of claim 4, wherein the transmitter further comprises:
    an isolator for isolating the transmitter from signal interference created by the switching mechanism.

6. The transceiver of claim 1, wherein the switching mechanism comprises:
    an antenna;
    a switch for selectively connecting the antenna to the receiver and the transmitter; and
    a duplexer positioned between the antenna and the switch.

7. The transceiver of claim 6, wherein at least one of the first and second ground separation elements is an inductor.

8. The transceiver of claim 6, wherein at least one of the first and second ground separation elements is a ferrite bead.

9. The transceiver of claim 1, wherein the ground divider comprises:
    a first ground separation element for isolating a receiver ground for the receiver and a common ground for the switching mechanism from each other; and
    a second ground separation element for isolating a transmitter ground for the transmitter and the common ground.

10. A method of data communication in a TDD-based mobile communication system, the method comprising:
    processing a reception signal received by a receiver of the mobile communication system in a reception mode;
    processing a transmission signal transmitted by a transmitter of the mobile communication system in a transmission mode, where in a switching mechanism is operable in the transmission mode and the reception mode; and dividing grounds for the receiver, the transmitter, and the switching mechanism, such that electrical components of the receiver are coupled to a receiver ground exclusive to the receiver, electrical components of the transmitter are coupled to a transmitter ground exclusive to the transmitter, and electrical components of the switching mechanism are coupled to a common ground, wherein a first ground separation element is provided for isolating the receiver ground from the common ground; and a second ground separation element is provided for isolating the transmitter ground from the common ground.

11. The method claim 10, wherein the step of processing a reception signal in the reception mode comprises:

amplifying the reception signal provided by the switching mechanism, using a low-noise amplifier;

filtering the amplified reception signal using a reception filter; and providing the filtered reception signal to an intermediate frequency processor.

12. The method of claim 10, wherein the step of processing a transmission signal in a transmission mode comprises:

filtering the transmission signal received from an intermediate frequency processor using a transmission filter; and amplifying the filtered transmission signal.

13. The method of claim 10, wherein the step of processing a transmission signal in a transmission mode further comprises isolating the transmitter from signal interference created by the switching mechanism.

14. The method of claim 10, wherein the switching mechanism comprises:

an antenna;

a switch for selectively connecting the antenna to the receiver and the transmitter; and a duplexer positioned between the antenna and the switch.

15. The method of claim 10, wherein the first ground separation element is an inductor.

16. The method of claim 10, wherein the first ground separation element is a ferrite bead.

17. The method of claim 10, wherein the second ground separation element is a ferrite bead.

18. The method of claim 10, wherein the switching mechanism comprises:

an antenna a duplexer connected to the antenna, the duplexer selecting transmission and reception frequency via the antenna;

a circulator for sending the reception signal from the duplexer to the receiver and for sending the transmission signal from the transmitter to the antenna, and a switch installed on a signal line between the circulator and the receiver, wherein the switch is turned on in the reception mode.

19. A transceiver of a terminal for use in a TDD-based time division synchronous CDMA (TD-CDMA) mobile communication system comprising:

a receiver for processing a reception signal in a reception mode;

a transmitter for processing a transmission signal in a transmission mode;

a switching mechanism operable in the transmission mode and the reception mode; and a ground divider for dividing grounds for the receiver, the transmitter, and the switching mechanism, such that electrical components of the receiver are coupled to a receiver ground exclusive to the receiver, components of the transmitter are coupled to a transmitter ground exclusive to the transmitter, and components of the switching mechanism are coupled to a common ground, wherein the ground divider comprises:

a first ground separation element for isolating the receiver ground from the common ground; and a second ground separation element for isolating the transmitter ground from the common ground.

* * * * *